(12) United States Patent
Yoo

(10) Patent No.: US 10,880,546 B2
(45) Date of Patent: Dec. 29, 2020

(54) METHOD AND APPARATUS FOR DERIVING INTRA PREDICTION MODE FOR CHROMA COMPONENT

(71) Applicant: LG ELECTRONICS INC., Seoul (KR)

(72) Inventor: Sunmi Yoo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/339,338

(22) PCT Filed: Sep. 28, 2017

(86) PCT No.: PCT/KR2017/010842
§ 371 (c)(1),
(2) Date: Apr. 3, 2019

(87) PCT Pub. No.: WO2018/070713
PCT Pub. Date: Apr. 19, 2018

(65) Prior Publication Data
US 2020/0045311 A1 Feb. 6, 2020

Related U.S. Application Data

(60) Provisional application No. 62/406,460, filed on Oct. 11, 2016.

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/159* (2014.11); *H04N 19/176* (2014.11); *H04N 19/186* (2014.11); *H04N 19/196* (2014.11)

(58) Field of Classification Search
CPC .... H04N 19/11; H04N 19/196; H04N 19/186; H04N 19/176; H04N 19/159;
(Continued)

(56) References Cited

U.S. PATENT DOCUMENTS

2013/0336591 A1* 12/2013 Jeon ........................ H04N 19/16
382/238
2015/0016521 A1* 1/2015 Peng ..................... H04N 19/192
375/240.12

FOREIGN PATENT DOCUMENTS

KR 10-2013-0005233 A 1/2013
KR 10-2013-0050900 A 5/2013
(Continued)

*Primary Examiner* — Jared Walker
(74) *Attorney, Agent, or Firm* — Dentons US LLP

(57) ABSTRACT

The present invention relates to a method for decoding a chroma block of a video signal, wherein the method comprises: a step of determining whether or not an intra prediction mode of the chroma block is being derived; a step of determining the intra prediction mode of the chroma block by using a prediction mode derivation method when the intra prediction mode of the chroma block is being derived; and a step of decoding the chroma block on the basis of the intra prediction mode of the chroma block, and wherein the prediction mode derivation method comprises: a step of acquiring a template prediction value by using a reference pixel neighboring a predefined template; a step of determining a template prediction mode that minimizes the difference between the predefined template and the template prediction value; and a step of setting the template prediction mode to the intra prediction mode of the chroma block.

10 Claims, 15 Drawing Sheets

(51) Int. Cl.
*H04N 19/176* (2014.01)
*H04N 19/186* (2014.01)
*H04N 19/196* (2014.01)

(58) Field of Classification Search
CPC .... H04N 19/167; H04N 19/105; H04N 19/70; H04N 19/593
USPC .................................................. 375/240.12
See application file for complete search history.

(56) References Cited

FOREIGN PATENT DOCUMENTS

| | | | |
|---|---|---|---|
| KR | 10-2014-0068269 A | 6/2014 | |
| KR | 10-2014-0088100 A | 7/2014 | |
| KR | 10-2016-0057364 A | 5/2016 | |

\* cited by examiner (a)

(b)

Intra:

2Nx2N   NxN

Inter:

2Nx2N   NxN   2NxN   Nx2N nLx2N   nRx2N   2NxnU   2NxnD (a)          (b)

(a) Luma                    (b) Chroma (a)

(b)

(a)

(b)

(a)

(b)

(a)

(b)

(a)

(b)

METHOD AND APPARATUS FOR DERIVING INTRA PREDICTION MODE FOR CHROMA COMPONENT

CROSS-REFERENCE TO RELATED APPLICATIONS

This application is the National Stage filing under 35 U.S.C. 371 of International Application No. PCT/KR2017/010842, filed on Sep. 28, 2017, which claims the benefit of U.S. Provisional Applications No. 62/406,460, filed on Oct. 11, 2016, the contents of which are all hereby incorporated by reference herein in their entirety.

TECHNICAL FIELD

The present invention relates to a method and apparatus for encoding/decoding a video signal and, more particularly, to a method of deriving an intra prediction mode for a chroma component.

BACKGROUND ART

Compression coding means a series of signal processing technologies for transmitting digitized information through a communication line or storing digitized information in a form suitable for a storage medium. Media, such as video, an image and voice, may become the subject of compression coding. Specifically, a technology for performing compression encoding on video is called video image compression.

In order to represent a digital image, various color space formats for a luma component and a chroma component are used. A color space format commonly used for video coding among the various color space formats is a YCbCr format. Y means a luma component, and Cb and Cr mean chroma components. A 4:2:0 format in which more information is assigned to a luma component is chiefly used because an eye of the human being is more sensitive to a luma component than to the chroma component. Each of the Cb component and the Cr component has a ¼ size of the luma component, and thus the chroma component may be represented by only the amount of data corresponding to half the luma component. It has been known that the human being does not significantly recognize small chroma information.

An efficient coding method of the chroma component has been researched in various ways because the 4:2:0 format is chiefly used for such digital image coding. In general, upon video-coding, first, after a luma component is coded, a corresponding chroma component is coded. In this case, information of the chroma component and information of the luma component have high similarity because they correspond to each other.

Accordingly, it is necessary to reduce a lot of additional information using information, coded in a luma component, for chroma component coding.

DISCLOSURE

Technical Problem

The present invention is to propose a method of encoding, decoding a video signal more efficiently.

Furthermore, the present invention is to propose a method of deriving an intra prediction mode of a luma block or a chroma block.

Furthermore, the present invention is to propose a method of encoding or decoding a chroma block when an intra prediction mode of a luma block or the chroma block is derived.

Furthermore, the present invention is to propose a method of deriving an intra prediction mode of a chroma block when partition information of a luma block and a chroma block is the same.

Furthermore, the present invention is to propose a method of deriving an intra prediction mode of a chroma block when partition information of a luma block and a chroma block is not the same.

Furthermore, the present invention is to propose a method of determining an intra prediction mode of a chroma block based on at least one of a luma mode derivation flag and a chroma mode derivation flag.

Technical Solution

In order to accomplish the object, the present invention provides a method of defining a luma mode derivation flag and a chroma mode derivation flag.

Furthermore, the present invention provides a method of determining an intra prediction mode of a chroma block based on at least one of a luma mode derivation flag and a chroma mode derivation flag.

Furthermore, the present invention provides a method of determining an intra prediction mode of a chroma block based on a chroma mode derivation flag regardless of coding information of a luma block.

Furthermore, the present invention provides a method of determining an intra prediction mode of a chroma block based on an intra prediction mode of a luma block when partition information of the luma block and the chroma block is the same.

Furthermore, the present invention provides a method of determining an intra prediction mode of a chroma block based on a chroma mode derivation flag when partition information of a luma block and the chroma block is not the same.

Advantageous Effects

The present invention can reduce the number of bits for additional information of a chroma component by deriving prediction mode of the chroma component with reference to at least one of coding information of a luma component or coding information of the chroma component when encoding or decoding is performed on a video signal.

BEST MODE

Figure 1:
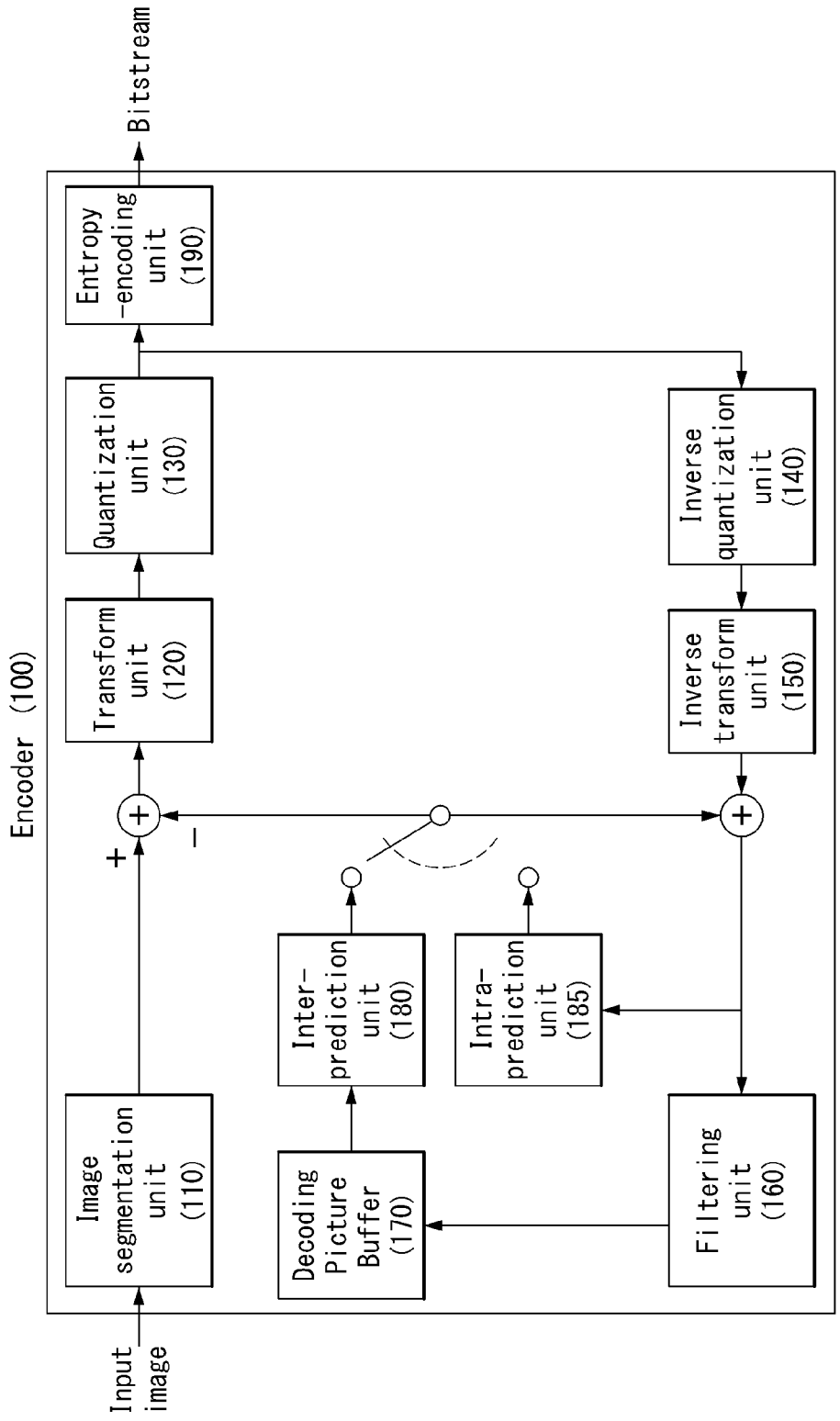
FIG. 1 is a block diagram illustrating a configuration of an encoder for encoding a video signal according to an embodiment of the present invention.

The present invention provides a method of decoding a chroma block of a video signal, including determining whether an intra prediction mode of the chroma block is derived; determining an intra prediction mode of the chroma block using a prediction mode derivation method when the intra prediction mode of the chroma block is derived; and decoding the chroma block based on the intra prediction mode of the chroma block, wherein the prediction mode derivation method includes obtaining a template predictor using a reference pixel neighboring a pre-defined template; determining a template prediction mode to minimize a difference between the pre-defined template and the template predictor; and setting the template prediction mode as the intra prediction mode of the chroma block.

In the present invention, whether the intra prediction mode of the chroma block is derived is determined based on at least one of a chroma mode derivation flag, a luma mode derivation flag, or division information of the chroma block. Te chroma mode derivation flag indicates whether the intra prediction mode of the chroma block is derived, the luma mode derivation flag indicates whether an intra prediction mode of a luma block is derived, and the division information comprises at least one of a division structure, shape or size of the chroma block.

In the present invention, the method further includes obtaining the chroma mode derivation flag. The intra prediction mode of the chroma block is derived based on the chroma mode derivation flag.

In the present invention, the method further includes checking whether the intra prediction mode of the luma block has been derived based on the luma mode derivation flag. If the intra prediction mode of the luma block has been derived, the intra prediction mode of the chroma block is derived.

In the present invention, the method further includes checking whether the division information of the chroma block is identical with division information of the luma block. When the division information of the chroma block is identical with the division information of the luma block, the intra prediction mode of the chroma block is derived.

In the present invention, the chroma mode derivation flag or the luma mode derivation flag is defined in at least one level of a video parameter set, a sequence parameter set, a picture parameter set, a slice segment header, a coding unit header or a processing unit.

In the present invention, the pre-defined template neighbors a top or left of the chroma block and has an N×L or L×N size, and a maximum size of the reference pixel is 2(L+N)+1 neighboring the pre-defined template.

The present invention provides an apparatus for decoding a chroma block of a video signal, including an intra prediction unit configured to determine whether an intra prediction mode of the chroma block is derived, determine an intra prediction mode of the chroma block using a prediction mode derivation method when the intra prediction mode of the chroma block is derived, and obtain a predictor of the chroma block based on the intra prediction mode of the chroma block and a reconstruction unit configured to reconstruct the video signal based on the predictor of the chroma block. The intra prediction unit is configured to obtain a template predictor using a reference pixel neighboring a pre-defined template, determine a template prediction mode to minimize a difference between the pre-defined template and the template predictor, and set the template prediction mode as the intra prediction mode of the chroma block.

In the intra prediction unit of the present invention, whether the intra prediction mode of the chroma block is derived is determined based on at least one of a chroma mode derivation flag, a luma mode derivation flag, or division information of the chroma block. The chroma mode derivation flag indicates whether the intra prediction mode of the chroma block is derived, the luma mode derivation flag indicates whether an intra prediction mode of a luma block is derived, and the division information comprises at least one of a division structure, shape or size of the chroma block.

In the present invention, the apparatus obtains the chroma mode derivation flag. The intra prediction mode of the chroma block is derived based on the chroma mode derivation flag.

In the present invention, the intra prediction unit is configured to confirm whether the intra prediction mode of the luma block has been derived based on the luma mode derivation flag. If the intra prediction mode of the luma block has been derived, the intra prediction mode of the chroma block is derived.

In the present invention, the apparatus checks whether the division information of the chroma block is identical with division information of the luma block. When the division information of the chroma block is identical with the division information of the luma block, the intra prediction mode of the chroma block is derived.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, an inverse quantization unit 140, an inverse transform unit 150, a filtering unit 160, a decoded picture buffer (DPB) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of description of the present invention, and the present invention is not limited to the definition of a corresponding term. Furthermore, in this specification, a term called a coding unit is used as a unit used in a process of encoding or decoding a video signal, but the present invention is not limited thereto and the unit may be properly interpreted depending on invention contents.

The encoder 100 may generate a residual signal by subtracting a prediction signal, output by the inter prediction unit 180 or the intra prediction unit 185, from an input video signal. The generated residual signal is transmitted to the transform unit 120.

The transform unit 120 may generate a transform coefficient by applying a transform scheme to the residual signal. The transform process may be applied to square pixel blocks having the same size and may be applied to non-square blocks of variable sizes.

The quantization unit 130 may quantize the transform coefficient and transmit it to the entropy encoding unit 190. The entropy encoding unit 190 may entropy-code the quantized signal and output it as a bit stream.

The quantized signal output by the quantization unit 130 may be used to generate a prediction signal. For example, dequantization and inverse transform may be applied to the quantized signal through the dequantization unit 140 and the inverse transform unit 150 within a loop, thereby being capable of reconstructing a residual signal. A reconstructed signal may be generated by adding the reconstructed residual signal to a prediction signal output by the inter prediction unit 180 or the intra prediction unit 185.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture.

The interpolation method may include linear interpolation, bi-linear interpolation and Wiener filter, etc. The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The present invention provides a method of defining a luma mode derivation flag and a chroma mode derivation flag.

Furthermore, the present invention provides a method of determining an intra prediction mode of a chroma block based on at least one of a luma mode derivation flag or a chroma mode derivation flag.

Furthermore, the present invention provides a method of determining an intra prediction mode of a chroma block based on a chroma mode derivation flag regardless of coding information of a luma block.

Furthermore, the present invention provides a method of determining an intra prediction mode of a chroma block based on an intra prediction mode of a luma block when partition information of the luma block and the chroma block is the same.

Furthermore, the present invention provides a method of determining an intra prediction mode of a chroma block based on a chroma mode derivation flag when partition information of a luma block and the chroma block is not the same.

The prediction signal generated via the inter-prediction unit 180 or the intra-prediction unit 185 may be used to generate the reconstructed signal or used to generate the residual signal.

Figure 2:
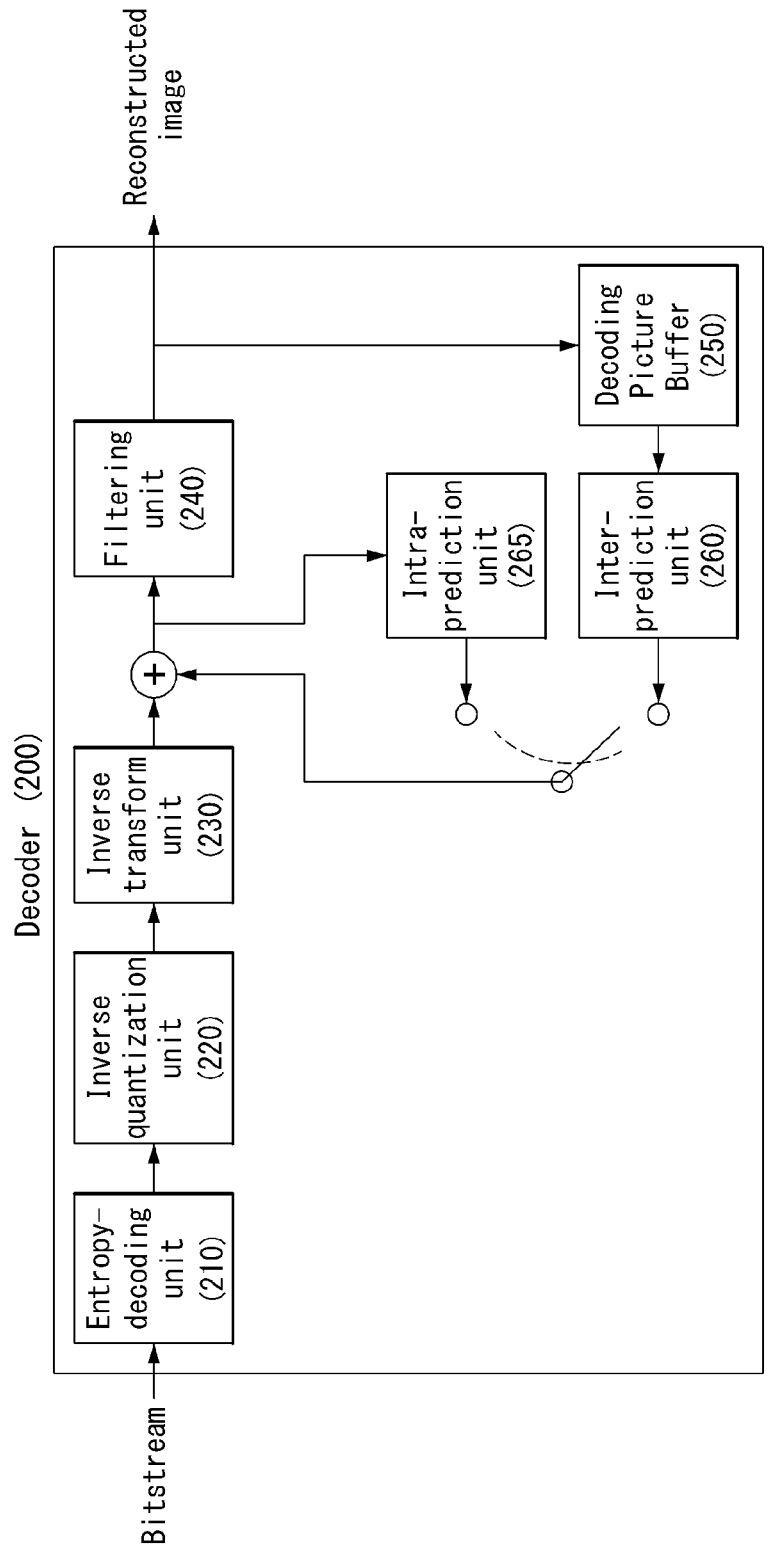
FIG. 2 is a block diagram illustrating a configuration of a decoder for decoding a video signal according to an embodiment of the present invention.

FIG. 2 is an embodiment to which the present invention is applied and is a schematic block diagram of a decoder in which the decoding of a video signal is performed.

Referring to FIG. 2, the decoder 200 may be configured to include a parsing unit (not shown), an entropy decoding unit 210, a dequantization unit 220, an inverse transform unit 230, a filtering unit 240, a decoded picture buffer (DPB) unit 250, an inter prediction unit 260, an intra prediction unit 265 and a reconstruction unit (not shown).

For another example, the decoder 200 may be simply represented as including a parsing unit (not shown), a block split determination unit (not shown) and a decoding unit (not shown). In this case, embodiments to which the present invention is applied may be performed through the parsing unit (not shown), the block split determination unit (not shown) and the decoding unit (not shown).

The decoder 200 may receive a signal output by the encoder 100 of FIG. 1, and may parse or obtain a syntax element through the parsing unit (not shown). The parsed or obtained signal may be entropy-decoded through the entropy decoding unit 210.

The dequantization unit 220 obtains a transform coefficient from the entropy-decoded signal using quantization step size information.

The inverse transform unit 230 obtains a residual signal by inversely transforming the transform coefficient.

The reconstruction unit (not shown) generates a reconstructed signal by adding the obtained residual signal to a prediction signal output by the inter prediction unit 260 or the intra prediction unit 265.

The filtering unit 240 applies filtering to the reconstructed signal and transmits the filtered signal to a playback device or transmits the filtered signal to the decoded picture buffer unit 250. The filtered signal transmitted to the decoded picture buffer unit 250 may be used as a reference picture in the inter prediction unit 260.

In this specification, the embodiments described in the filtering unit 160, inter prediction unit 180 and intra prediction unit 185 of the encoder 100 may be identically applied to the filtering unit 240, inter prediction unit 260 and intra prediction unit 265 of the decoder, respectively.

The present invention provides a method of determining an intra prediction mode of a chroma block based on at least one of a luma mode derivation flag or a chroma mode derivation flag.

Furthermore, the present invention provides a method of determining an intra prediction mode of a chroma block based on a chroma mode derivation flag regardless of coding information of a luma block.

Furthermore, the present invention provides a method of determining an intra prediction mode of a chroma block based on an intra prediction mode of a luma block when partition information of the luma block and the chroma block is the same.

Furthermore, the present invention provides a method of determining an intra prediction mode of a chroma block based on a chroma mode derivation flag when partition information of a luma block and the chroma block is not the same.

The reconstructed video signal output through the decoder 200 may be played back through a playback device.

Figure 3:
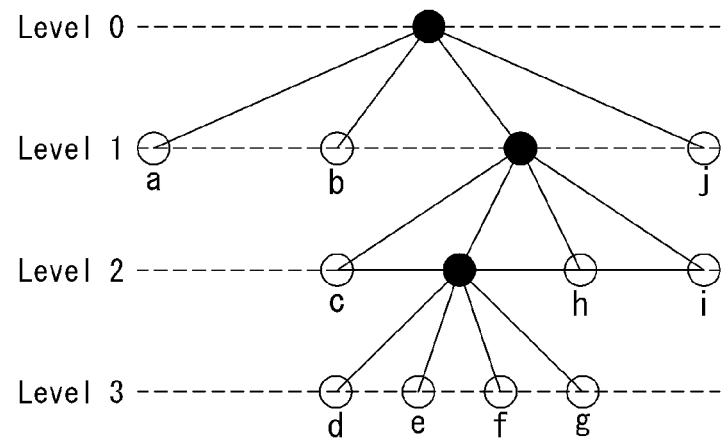
FIG. 3 is a diagram illustrating a division structure of a coding unit according to an embodiment of the present invention.
Figure 3:
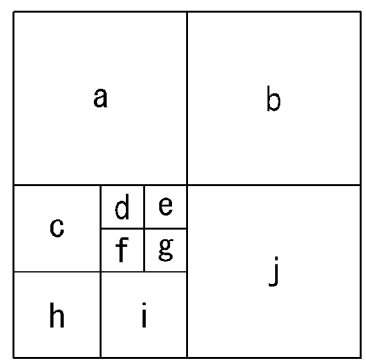

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, the size of the CTU may be determined to any one of 64×64, 32×32, and 16×16, but the present invention is not limited thereto. The encoder may select and use the size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, the size of the CU may be determined to any one of 64×64, 32×32, 16×16, and 8×8, but the present invention is not limited thereto, and when video is high resolution video, the size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information indicates the split number and/or a level of the CU, the depth information may include information about the size of the CU.

Because the LCU is split in a QT form, when using the size of the LCU and maximum depth information, the size of the SCU may be obtained. Alternatively, in contrast, when using the size of the SCU and maximum depth information of a tree, the size of the LCU may be obtained.

For one CU, information indicating whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, the size of the TU may be determined to any one of 32×32, 16×16, 8×8, and 4×4, but the present invention is not limited thereto, and when the TU is high resolution video, the size of the TU may increase or may be various sizes.

For one TU, information indicating whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

Figure 4:
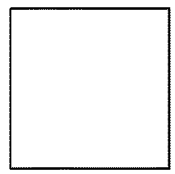
FIG. 4 is an embodiment to which the present invention is applied and is a diagram for illustrating a prediction unit.
Figure 4:
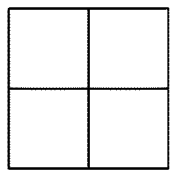
Figure 4:
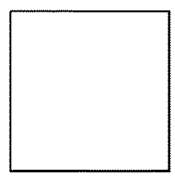
Figure 4:
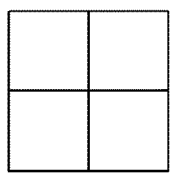
Figure 4:
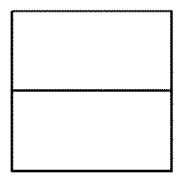
Figure 4:
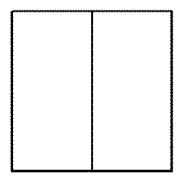
Figure 4:
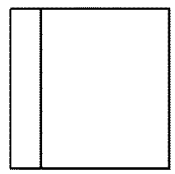
Figure 4:
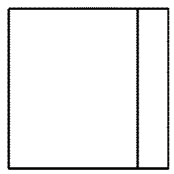
Figure 4:
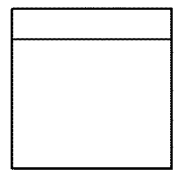
Figure 4:
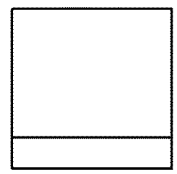

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU, calculated in the process 2), with the sum of the rate-distortion values of the four 16×16 CUs calculated in the process 5). This process is performed on the remaining three 32×32 CUs in the same manner.

7) Finally, an optimum partition structure of a CU within the 64×64 block is determined by comparing the rate-distortion value of the 64×64 CU, calculated in the process 1), with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

Figure 5:
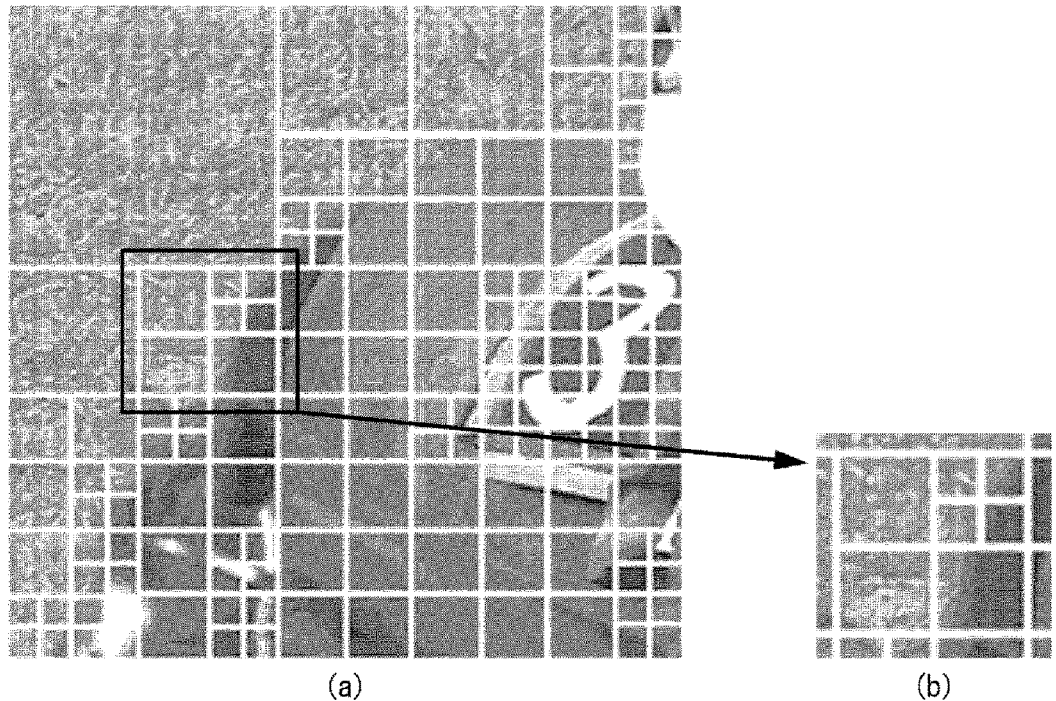
FIG. 5 is an embodiment to which the present invention may be applied and is a diagram for illustrating a quadtree (hereinafter referred to as a "QT") block division structure and problems thereof.

FIG. 5 is an embodiment to which the present invention may be applied and is a diagram for illustrating a quadtree (hereinafter referred to as a "QT") block division structure and problems thereof.

The present invention can reduce a lot of additional information using information, coded in a luma component, for chroma component coding. Specifically, when a coding unit of a chroma component is defined, the partition of a luma component can be borrowed without any change.

Referring to FIG. 5(a), a coding unit may be basically partitioned into four according to a square quadtree method. The partition chiefly occurs in the boundary portion of an object, and enables high-quality video compression because the accuracy of prediction is increases as the coding unit is subdivided. A degree of partition is indicated as a quadtree depth. A degree of partition is indicated as a depth 0 in a maximum unit size, and means that more partition has been performed as the size of the depth increases.

However, if a partition method enables only 4 partitions, it is difficult to handle shapes of various objects. If 2 equal partitions have been performed in the partition of an upper depth as in FIG. 5(b), bits for partition and additional information, such as prediction information, with respect to one subblock may be less transmitted. However, a bottom-left coding unit (CU) occurs due to a quadtree split. A binarytree split method may also be applied as in FIG. 6 in order to prevent the occurrence of additional information attributable to over split as described above and to enable a more adaptive partition for video.

Figure 6:
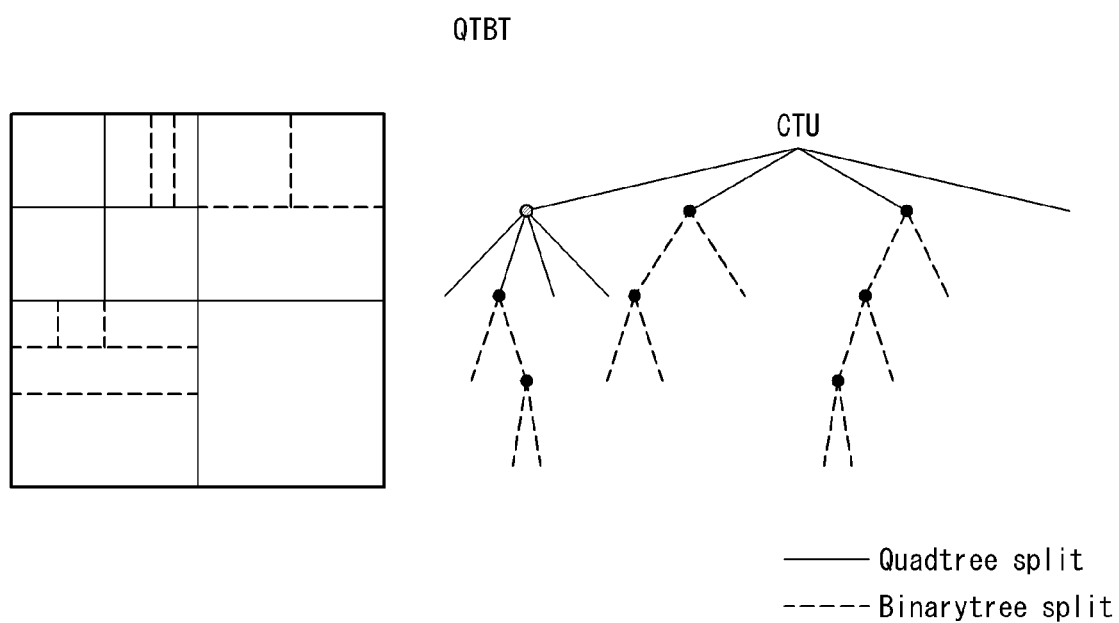
FIG. 6 is an embodiment to which the present invention is applied and is a diagram for illustrating a quadtree binarytree (hereinafter referred to as a "QTBT") block division structure.

FIG. 6 is an embodiment to which the present invention is applied and is a diagram for illustrating a quadtree binarytree (hereinafter referred to as a "QTBT") block division structure.

Quad-Tree Binarytree (QTBT)

A QTBT refers to a structure of a coding block in which a quadtree structure and a binarytree structure have been combined. Specifically, in a QTBT block division structure, an image is coded in a CTU unit. A CTU is split in a quadtree form. A leaf node of a quadtree is additionally split in a binarytree form.

Hereinafter, a QTBT structure and a split flag syntax supporting the same are described with reference to FIG. 6.

Referring to FIG. 6, a current block may be split in a QTBT structure. That is, a CTU may be first hierarchically split in a quadtree form. Furthermore, a leaf node of the quadtree that is no longer spit in a quadtree form may be hierarchically split in a binarytree form.

The encoder may signal a split flag in order to determine whether to split a quadtree in a QTBT structure. In this case, the quadtree split may be adjusted (or limited) by a MinQTLumaIslice, MinQTChromaIslice or MinQTNonIslice value. In this case, MinQTLumaIslice indicates a minimum size of a quadtree leaf node of a luma component in an I-slice. MinQTLumaChromaIslice indicates a minimum size of a quadtree leaf node of a chroma component in an I-slice. MinQTNonIslice indicates a minimum size of a quadtree leaf node in a non-I-slice.

In the quadtree structure of a QTBT, a luma component and a chroma component may have independent division structures in an I-slice. For example, in the case of an I-slice in the QTBT structure, the division structures of a luma component and chroma component may be differently determined. In order to support such a division structure, MinQTLumaIslice and MinQTChromaIslice may have different values.

For another example, in a non-I-slice of a QTBT, the division structures of a luma component and chroma component in the quadtree structure may be identically determined. For example, in the case of a non-I-slice, the quadtree split structures of a luma component and chroma component may be adjusted by a MinQTNonIslice value.

In the QTBT structure, a leaf node of the quadtree may be split in a binarytree form. In this case, the binarytree split may be adjusted (or limited) by MaxBTDepth, MaxBTDepthISliceL and MaxBTDepthISliceC. In this case, MaxBTDepth indicates a maximum depth of the binarytree split based on a leaf node of the quadtree in a non-I-slice. MaxBTDepthISliceL indicates a maximum depth of the binarytree split of a luma component in an I-slice. MaxBTDepthISliceC indicates a maximum depth of the binarytree split of a chroma component in the I-slice.

Furthermore, in the I-slice of a QTBT, MaxBTDepthISliceL and MaxBTDepthISliceC may have different values in the I-slice because a luma component and a chroma component may have different structures.

Figure 7:
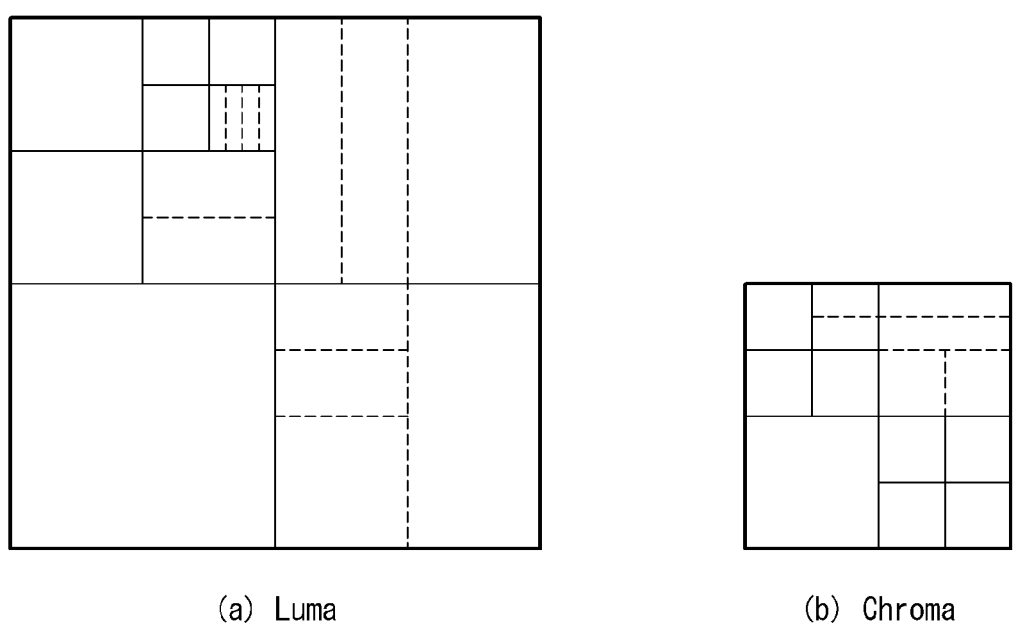
FIG. 7 is an embodiment to which the present invention is applied and is a diagram for illustrating a comparison between the block division structures of a QTBT for a luma component and a chroma component.

FIG. 7 is an embodiment to which the present invention is applied and is a diagram for illustrating a comparison between the block division structures of a QTBT for a luma component and a chroma component.

Referring to FIG. 7, it is assumed that a current slice is an I-slice. FIG. 7(a) shows the division structure of a QTBT for a luma component, and FIG. 7(b) shows the division structure of a QTBT for a chroma component. A leaf node of a quadtree split in a quadtree structure may be split in a binarytree form. As described above, in the I-slice, the luma component and chroma component may have different division structures.

In the case of the division structure of a QTBT, the quadtree structure and the binarytree structure may be used together. In this case, the following rule may be applied.

First, MaxBTSize is smaller than or equal to MaxQTSize. In this case, MaxBTSize indicates a maximum size of a binarytree split, and MaxQTSize indicates a maximum size of the quadtree split.

Second, a leaf node of a QT becomes the root of a BT.

Third, once a split into a BT is performed, it cannot be split into a QT again.

Fourth, a BT defines a vertical split and a horizontal split.

Fifth, MaxQTDepth, MaxBTDepth are previously defined. In this case, MaxQTDepth indicates a maximum depth of a quadtree split, and MaxBTDepth indicates a maximum depth of a binarytree split.

Sixth, MaxBTSize, MinQTSize may be different depending on a slice type.

As described above, the QTBT structure may be represented like FIG. 7.

In the YCbCr format, luma and chroma components have similarity because video has been divided into the luma and chroma components, but the chroma component is simpler than the luma component.

Accordingly, the present invention provides a method of improving coding efficiency by preserving the unique characteristics of each component. For example, in the present invention, a unique division structure of a chroma component may be defined and coded separately from the division structure of a luma component. A prediction mode for a chroma block may be derived based on the unique division structure of the chroma component.

In one embodiment, a coding unit of a chroma component may be defined using some of partition information of a luma component.

A small coding unit compared to a chroma component may be applied to a luma component because the luma component includes a lot of detailed information of video, such as edge information of an object. If a chroma component borrows division information of a luma component without any change, a relatively monotonous coding unit of the chroma component compared to the luma component may be generated as a subdivided structure compared to that expected. In contrast, if a coding unit of a chroma component is defined independently of a luma component, additional information on the division of the chroma component may be increased although the entire throughput of data is small compared to the luma component.

Hereinafter, various methods of deriving an intra prediction mode of a luma block or a chroma block are described below.

Figure 8:
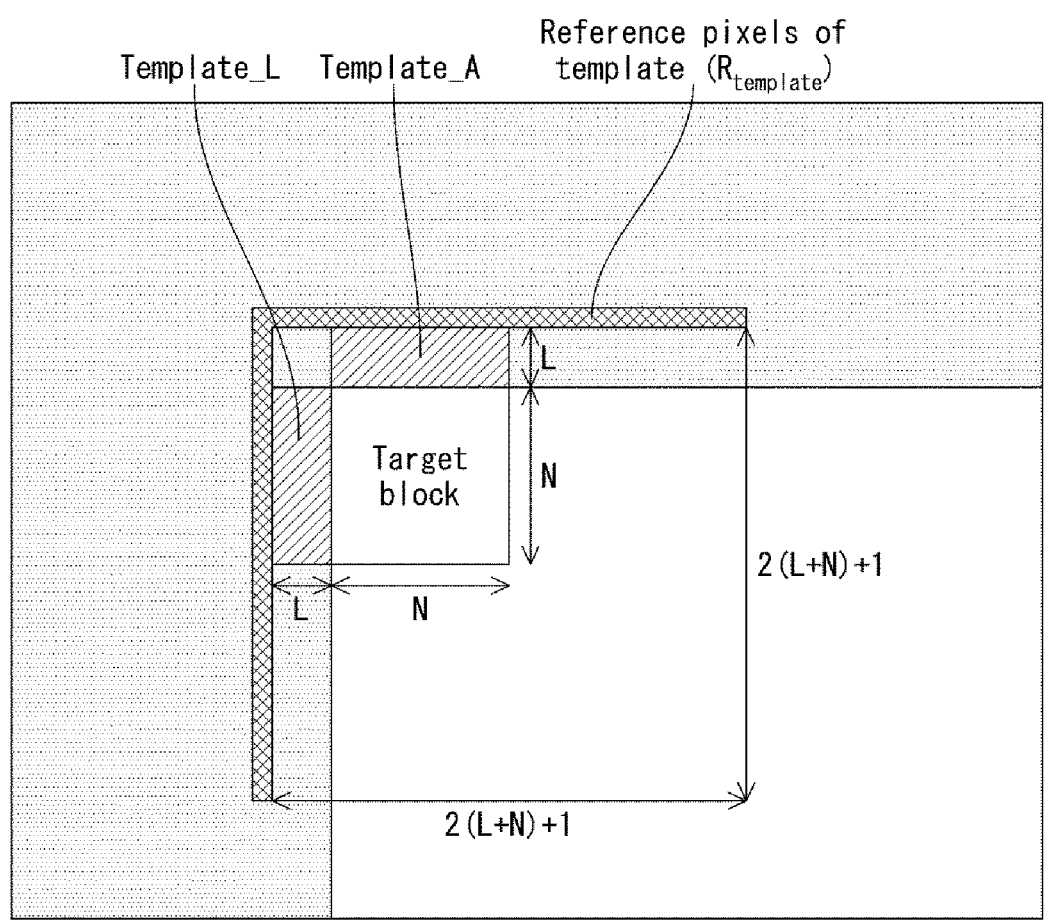
FIG. 8 is an embodiment to which the present invention is applied and shows template and reference pixels for illustrating a prediction mode derivation method.

FIG. 8 is an embodiment to which the present invention is applied and shows template and reference pixels for illustrating a prediction mode derivation method.

The present invention provides a method of deriving an intra prediction mode of a block to be now decoded (or target block) by the decoder when a luma component is decoded.

FIG. 8 shows a target block, templates Template_A and Template_L neighboring the target block, and the reference pixels $R_{template}$ of the template. A dark portion indicates an already decoded region. In this case, assuming that the target block is N×N and the templates Template_A and Template_L are L×N and N×L, respectively, a maximum number (or maximum size) of the reference pixels of the template may be 2(L+N)+1 in a horizontal or vertical direction.

In order to reconstruct a region, an intra prediction method, an already reconstructed peripheral sample may be used and an intra prediction mode may be derived using the peripheral sample. This is called a prediction mode derivation method. Alternatively, this may be called decoder-side intra mode derivation (DIMD).

For example, in the case of FIG. 8, a template may be derived in order to drive an intra prediction mode of the target block. In this case, the shape of the template may be defined as an already reconstructed N×L pixel or L×N pixel on the left and top of the target block. However, the present invention is not limited thereto, and various shapes or sizes may be used.

The encoder or the decoder may perform a prediction on various intra prediction modes using reference pixels neighboring a template. Furthermore, the encoder or the decoder may find a template prediction mode that minimizes a difference between a template and a template predictor. For example, an intra prediction mode having the smallest sum of absolute difference (SAD) between a template and a template predictor may be used as the template prediction mode, and the template prediction mode may be used as an intra prediction mode of the target block.

The encoder and the decoder do not transmit separate mode information because they can use neighboring pixels, and can reduce the number of bits through a method of deriving mode information.

Figure 9:
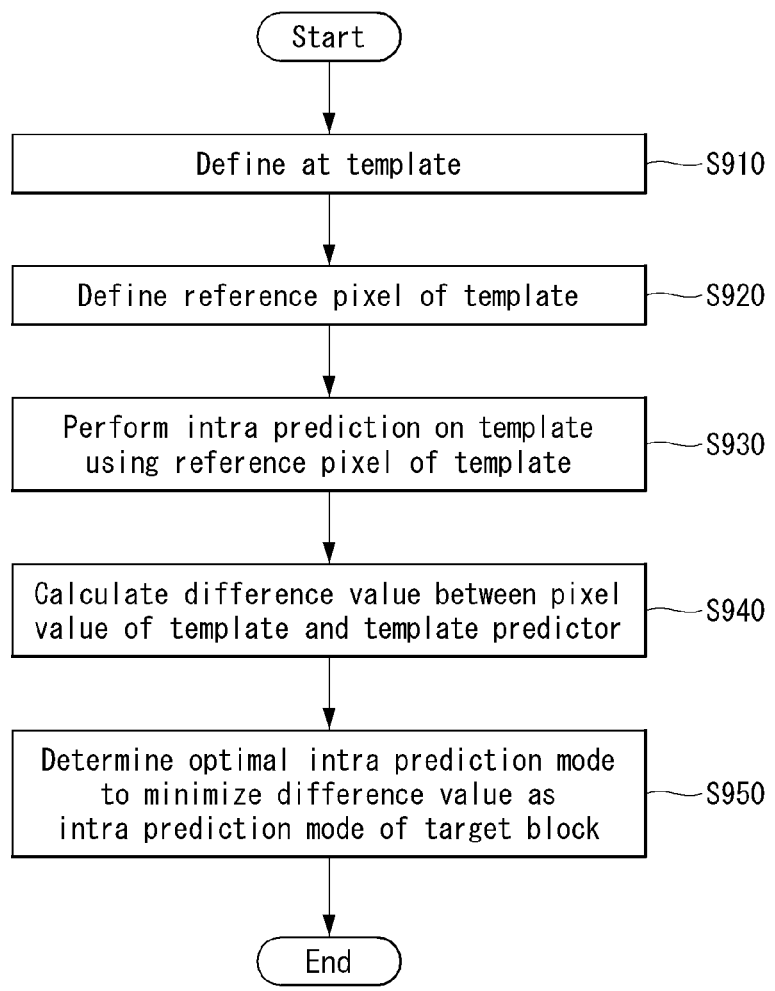
FIG. 9 is an embodiment to which the present invention is applied and shows a flowchart in which a prediction mode derivation method is performed on a chroma block.

FIG. 9 is an embodiment to which the present invention is applied and shows a flowchart in which a prediction mode derivation method is performed on a chroma block.

An embodiment of the present invention provides a method of deriving a prediction mode of a luma block or a chroma block. The method may be performed in the encoder or the decoder. In this specification, a method of deriving a prediction mode of a chroma block by the decoder is chiefly described, but the present invention is not limited thereto and may also be applied to the encoder.

First, the encoder or the decoder may define a template for a prediction mode derivation method (S910). The template means a set of predefined pixels and may be represented as a pattern. For example, if a target block is an N×N size, a template may mean a pixel block of an N×L or L×N (L≤N) size. In this case, L may correspond to the size of a subblock within the target block.

The template may be information already known to the encoder and/or the decoder, but the present invention is not limited thereto and the template may be adaptively determined.

The encoder or the decoder may define a reference pixel of the template (S920). The reference pixel of the template may be defined based on the location of the reference pixel used when an intra prediction is performed. For example, the reference pixel of the template may be defined as $R_{template}$ as in FIG. 8, but the present invention is not limited thereto and pixels of another block neighboring a template may be used.

Meanwhile, the template or the reference pixel may be information already known to the encoder and/or the decoder. In this case, steps S910 and S920 may be omitted.

The encoder or the decoder may perform an intra prediction on the template using the reference pixel of the template (S930).

As a result of step S930, the encoder or the decoder may obtain a template predictor.

The encoder or the decoder may calculate a difference value between a pixel value of the template and the template predictor (S940), and may determine or derive an optimal intra prediction mode (or called a template prediction mode) that minimizes the difference value as an intra prediction mode of the target block (S950).

In one embodiment, the prediction mode derivation method may be selectively used. For example, whether the prediction mode derivation method is applied may be defined as a flag. As a detailed example, a chroma mode derivation flag indicates whether an intra prediction mode of a chroma block is derived. A luma mode derivation flag indicates whether an intra prediction mode of a luma block is derived.

When the chroma mode derivation flag is 1, the intra prediction mode of the chroma block may be derived. When the chroma mode derivation flag is 0, the intra prediction mode of the chroma block may be derived. For example, the intra prediction mode of the chroma block may be parsed from a bit stream.

Likewise, when the luma mode derivation flag is 1, the intra prediction mode of the luma block may be derived. When the luma mode derivation flag is 0, the intra prediction mode of the luma block may be derived. For example, the intra prediction mode of the luma block may be parsed from a bit stream.

In one embodiment, the prediction mode derivation method may be always applied to a specific block size.

In one embodiment, the prediction mode derivation method may not be applied to a specific block size.

In one embodiment, whether the prediction mode derivation method is applied may be defined in at least one level of a video parameter set, a sequence parameter set, a picture parameter set, a slice segment header, a coding unit header or a processing unit.

In one embodiment, at least one of the chroma mode derivation flag or the luma mode derivation flag may be transmitted for each block or coding unit.

In one embodiment, the shape or size of the template may be defined in at least one level of a video parameter set, a sequence parameter set, a picture parameter set, a slice segment header, a coding unit header or a processing unit.

In one embodiment, the shape or size of the template may be variably defined based on the size of a current block.

Figure 10:
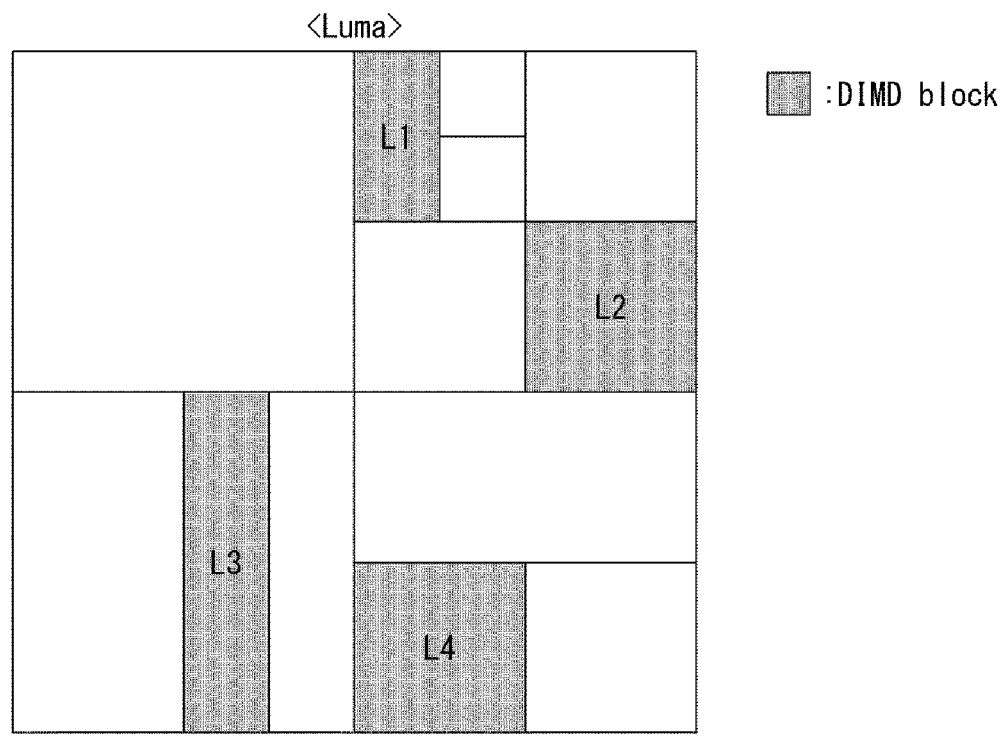
FIG. 10 is an embodiment to which the present invention is applied and is a diagram for illustrating a prediction mode derivation method for a chroma block when partition information of a luma block and the chroma block is the same.
Figure 10:
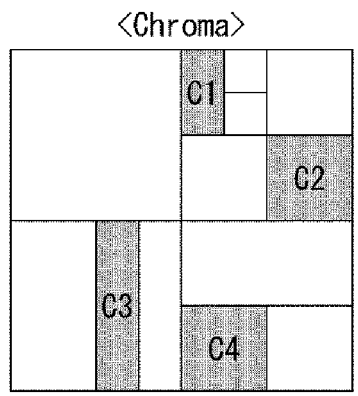

FIG. 10 is an embodiment to which the present invention is applied and is a diagram for illustrating a prediction mode derivation method for a chroma block when partition information of a luma block and the chroma block is the same.

The present invention provides a method of encoding or decoding a chroma component based on a prediction mode derivation method.

In one embodiment, the present invention provides a prediction mode derivation method for a chroma block when partition information of a luma block and the chroma block is the same. In this case, the partition information includes at least one of a division structure, the shape or size of the luma block or the chroma block.

For example, if a luma block and a chroma block is divided in the same shape or size (however, in the case of the 4:2:0 format, a chroma component is a ¼ size of a luma component) and a prediction mode derivation method has been applied to the luma block, the prediction mode derivation method may also be applied to the chroma block.

Referring to FIG. 10, FIG. 10(a) shows the block division structure of a luma component, and FIG. 10(b) shows the block division structure of a chroma component corresponding to the luma component. Furthermore, a shaded block shows a block (or DIMD block) to which a prediction mode derivation method has been applied among partition blocks.

As in FIG. 10(b), since the division structure and block shape of the chroma component are the same as those of the luma component, a prediction mode derivation method may be identically applied to chroma blocks C1, C2, C3, and C4 at locations corresponding to blocks L1, L2, L3, L4 to which a prediction mode derivation method has been applied within the luma component.

Accordingly, an optimal intra prediction mode may be determined based on the prediction mode derivation method, and the chroma block may be decoded based on the optimal intra prediction mode.

In another embodiment, the chroma blocks C1, C2, C3, and C4 may be decoded using the intra prediction mode of the blocks L1, L2, L3, L4 to which the prediction mode derivation method has been applied within the luma component.

In another embodiment, the chroma blocks may be decoded using one of intra prediction modes of neighboring (left, top, top-right, bottom-right) blocks of a current chroma block.

Figure 11:
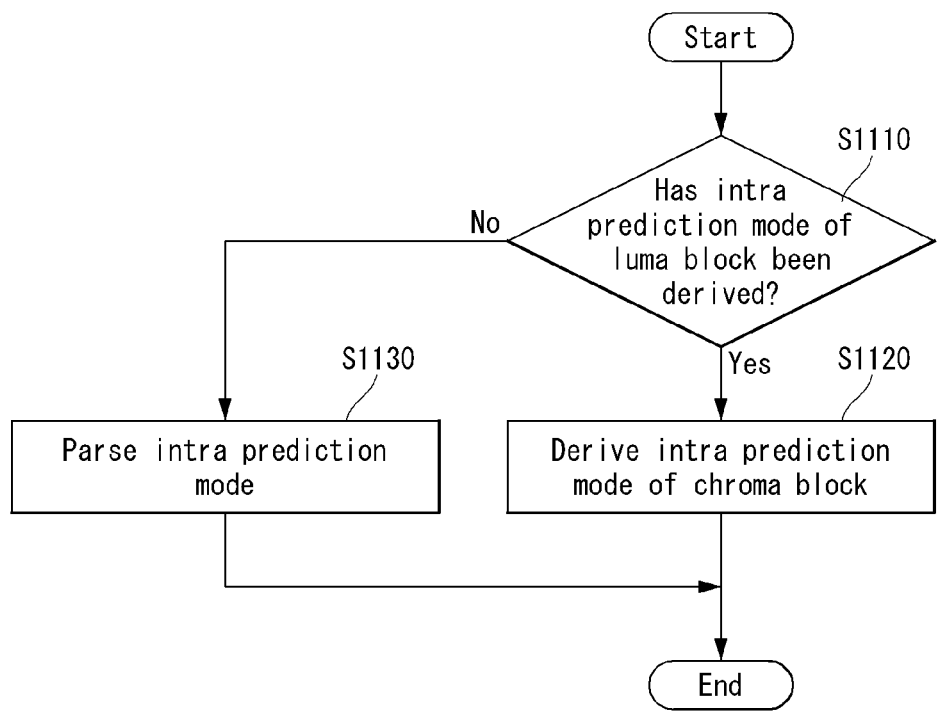
FIG. 11 is an embodiment to which the present invention is applied and shows a flowchart in which a prediction mode derivation method for a chroma block is performed based on a luma mode derivation flag.

FIG. 11 is an embodiment to which the present invention is applied and shows a flowchart in which a prediction mode derivation method for a chroma block is performed based on a luma mode derivation flag.

The present invention provides a method of determining whether to derive an intra prediction mode of a chroma block based on coding information of a luma block. For example, the decoder may check whether an intra prediction mode of a luma block corresponding to a chroma block has been derived, and may determine whether to apply a prediction mode derivation method on the chroma block based on a result of the determination.

First, the decoder may check whether an intra prediction mode of a luma block corresponding to a chroma block has been derived (S1110). In this case, a luma mode derivation flag indicating whether the intra prediction mode of the luma block has been derived may be used.

If the intra prediction mode of the luma block has been derived based on a result of the check, an intra prediction mode of the chroma block may be derived (S1120).

In contrast, if an intra prediction mode of the luma block has not been derived based on a result of the check, an intra prediction mode of the chroma block may be parsed from a bit stream (S1130).

The embodiments described in this specification may be applied to the present embodiment, but the description of a redundant portion is omitted.

Figure 12:
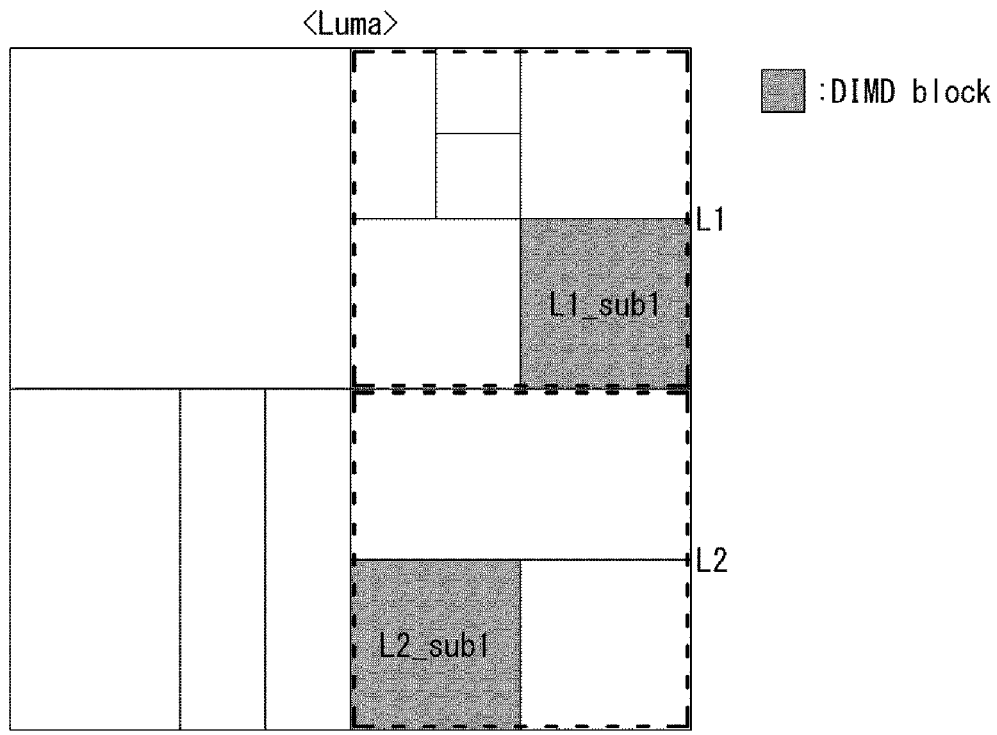
FIG. 12 is an embodiment to which the present invention is applied and is a diagram for illustrating a prediction mode derivation method for a chroma block when partition information of a luma block and the chroma block is not the same.
Figure 12:
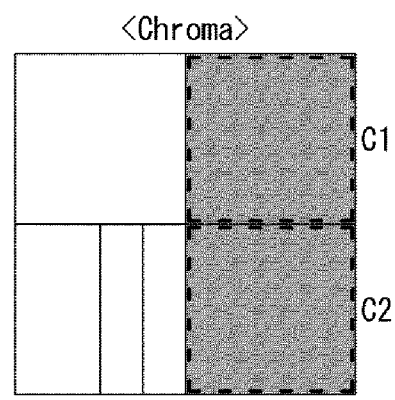

FIG. 12 is an embodiment to which the present invention is applied and is a diagram for illustrating a prediction mode derivation method for a chroma block when partition information of a luma block and the chroma block is not the same.

The present invention provides a method of encoding or decoding a chroma component based on a prediction mode derivation method.

In one embodiment, the present invention provides a prediction mode derivation method for a chroma block when partition information of a luma block and the chroma block is not the same. In this case, the partition information includes at least one of a division structure, the shape or size of the luma block or the chroma block.

For example, when the division structures of a luma block and a chroma block are different or at least one of a block shape or a block size is different, the decoder may determine whether to apply a prediction mode derivation method based on different coding information of a luma component. In this case, the different coding information includes a luma mode derivation flag. The luma mode derivation flag indicates whether an intra prediction mode of a luma block is derived.

When partition information of a luma block and a chroma block is different, but a prediction mode derivation method has been applied to some of or all luma blocks corresponding to the chroma block, a prediction mode derivation method may also be applied to the chroma block. In this case, the embodiments described in this specification may be applied to the prediction mode derivation method.

Referring to FIG. 12, FIG. 12(a) shows the block division structure of a luma component, and FIG. 12(b) shows the block division structure of a chroma component corresponding to the luma component. Furthermore, a shaded block shows a block (or DIMD block) to which a prediction mode derivation method has been applied among partition blocks.

As in FIG. 12(b), when partition information of a chroma component is different from that of a luma component, whether there is a block to which a prediction mode derivation method has been applied within the luma component corresponding to the chroma component may be checked.

As in FIG. 12(a), when at least one block L1_sub1 to which a prediction mode derivation method has been applied is present within a luma component L1 corresponding to a chroma component C1, a prediction mode derivation method may be applied to the chroma component C1.

Likewise, when at least one block L2_sub1 to which a prediction mode derivation method has been applied is present within a luma component L2 corresponding to a chroma component C2, a prediction mode derivation method may be applied to the chroma component C2.

Accordingly, an optimal intra prediction mode for the chroma blocks C1, C2 may be determined based on the prediction mode derivation method, and the chroma blocks may be decoded using the optimal intra prediction mode.

In another embodiment, the chroma blocks C1, C2 may be decoded using an intra prediction mode of the block L1, L2, L1_sub1, or L2_sub1 to which a prediction mode derivation method has been applied within the luma component.

In another embodiment, the chroma blocks may be decoded using one of intra prediction modes of neighboring (left, top, top-right, bottom-right) blocks of a current chroma block.

Figure 13:
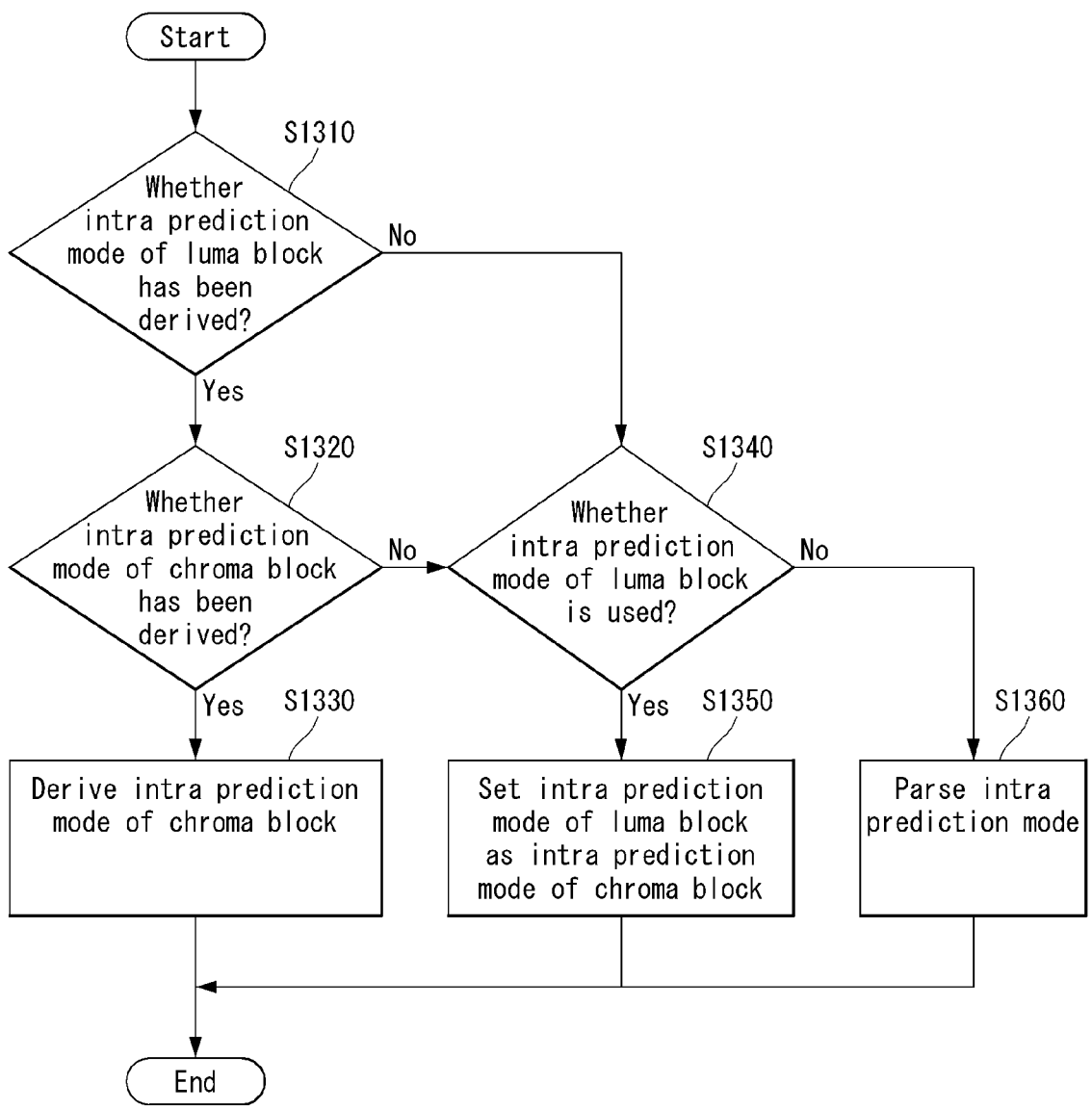
FIG. 13 is an embodiment to which the present invention is applied and shows a flowchart in which an intra prediction mode of a chroma block is determined based on at least one of a luma mode derivation flag and a chroma mode derivation flag.

FIG. 13 is an embodiment to which the present invention is applied and shows a flowchart in which an intra prediction mode of a chroma block is determined based on at least one of a luma mode derivation flag and a chroma mode derivation flag.

The present invention provides a method of performing an intra prediction on a chroma block based on at least one of coding information of a luma block or coding information of the chroma block. For example, the decoder may check whether an intra prediction mode of a luma block has been derived and whether an intra prediction mode of a chroma block has been derived, and may perform an intra prediction on the chroma block based on the results.

First, the decoder may check whether an intra prediction mode of a luma block corresponding to a chroma block has been derived (S1310). In this case, a luma mode derivation flag indicating whether the intra prediction mode of the luma block has been derived may be used.

If, as a result of the check in step S1310, the intra prediction mode of the luma block has been derived, whether an intra prediction mode of the chroma block is derived may be checked (S1320). In this case, a chroma mode derivation flag indicating whether the intra prediction mode of the chroma block is derived may be used.

If, as a result of the check in step S1320, the intra prediction mode of the chroma block is derived, the intra prediction mode of the chroma block may be derived (S1330). In this case, the embodiments described in this specification may be applied to the prediction mode derivation method.

Meanwhile, if, as a result of the check in step S1310, the intra prediction mode of the luma block is not derived, whether to use the intra prediction mode of the luma block may be checked (S1340).

Furthermore, if, as a result of the check in step S1320, an intra prediction mode of the chroma block is not derived, whether to use the intra prediction mode of the luma block for the intra prediction of the chroma block may be checked (S1340).

If, as a result of the check in step S1340, the intra prediction mode of the luma block is used for the intra prediction of the chroma block, the decoder may set the intra prediction mode of the luma block as the intra prediction mode of the chroma block (S1350).

Meanwhile, if, as a result of the check in step S1340, the intra prediction mode of the luma block is not used for the intra prediction of the chroma block, the intra prediction mode of the chroma block may be parsed from a bit stream (S1360).

The embodiments described in this specification may be applied to the present embodiment, but the description of a redundant portion is omitted.

Figure 14:
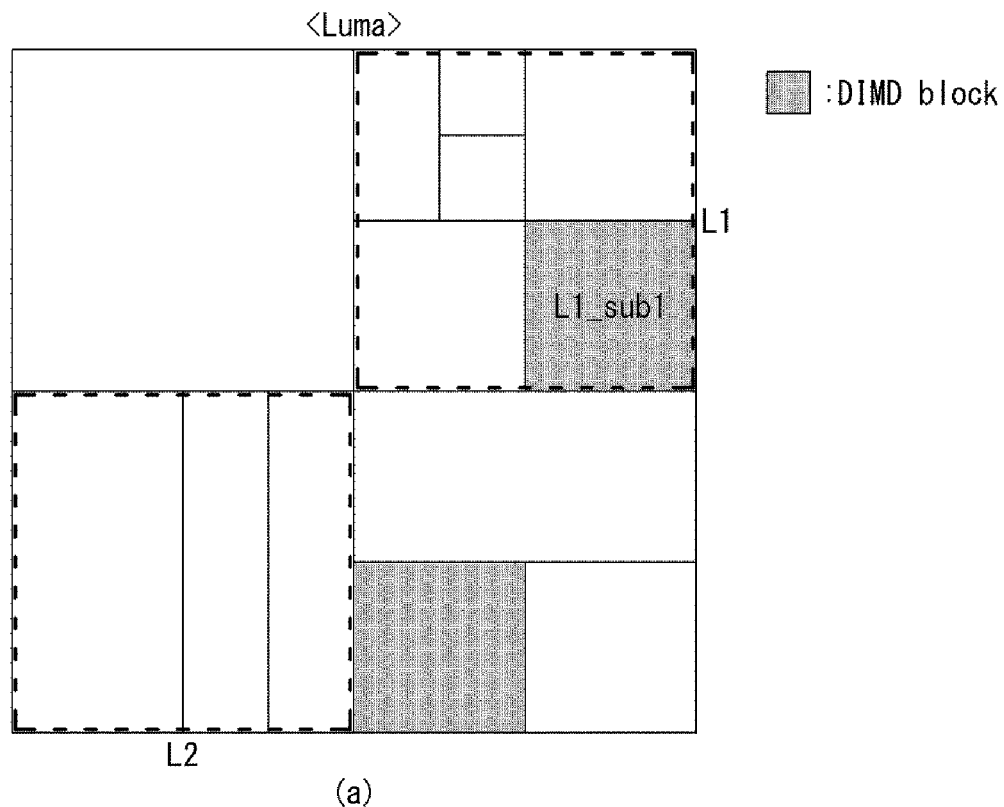
FIG. 14 is an embodiment to which the present invention is applied and is a diagram for illustrating a method of determining an intra prediction mode of a chroma block based on a chroma mode derivation flag regardless of coding information of a luma block.
Figure 14:
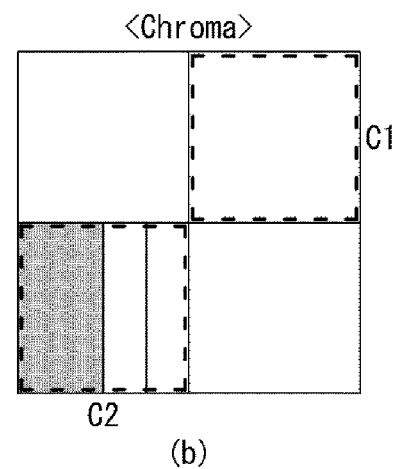

FIG. 14 is an embodiment to which the present invention is applied and is a diagram for illustrating a method of determining an intra prediction mode of a chroma block based on a chroma mode derivation flag regardless of coding information of a luma block.

The present invention provides a method of encoding or decoding a chroma component based on a prediction mode derivation method.

In one embodiment, the present invention provides a prediction mode derivation method for a chroma block regardless of coding information of a luma block. In this case, the coding information of the luma block may include at least one of partition information or a luma mode derivation flag. The partition information includes at least one of the division structure, shape or size of the luma block. The luma mode derivation flag indicates whether an intra prediction mode of the luma block is derived.

In one embodiment, the decoder may determine an intra prediction mode of a chroma block based on a chroma mode derivation flag regardless of coding information of a luma block.

Referring to FIG. 14, FIG. 14(a) shows the block division structure of a luma component, and FIG. 14(b) shows the block division structure of a chroma component corresponding to the luma component. Furthermore, a shaded block shows a block (or DIMD block) to which a prediction mode derivation method has been applied among partition blocks.

As in FIG. 14(b), it may be seen that partition information of the chroma component is different from that of the luma component.

As in FIG. 14(a), although at least one block L1_sub1 to which a prediction mode derivation method has been applied is present within a luma component L1, a chroma component C1 corresponding to the luma component L1 may determine an intra prediction mode of a chroma block based on a chroma mode derivation flag.

For example, when the chroma mode derivation flag is 1, the intra prediction mode of the chroma block may be derived. When the chroma mode derivation flag is 0, the intra prediction mode of the chroma block may be parsed from a bit stream.

Likewise, although a block to which a prediction mode derivation method has been applied is not present within a luma component L2 corresponding to a chroma component C2, the chroma component C2 may determine an intra prediction mode of a chroma block based on a chroma mode derivation flag.

Accordingly, the chroma blocks C1, C2 may determine an intra prediction mode of the chroma blocks based on the chroma mode derivation flag, and the chroma blocks may be decoded using the intra prediction mode.

In another embodiment, the chroma blocks C1, C2 may be decoded using an intra prediction mode of the corresponding luma blocks L1, L2.

In another embodiment, the chroma blocks may be decoded using one of intra prediction modes of neighboring (left, top, top-right, bottom-right) blocks of a current chroma block.

Figure 15:
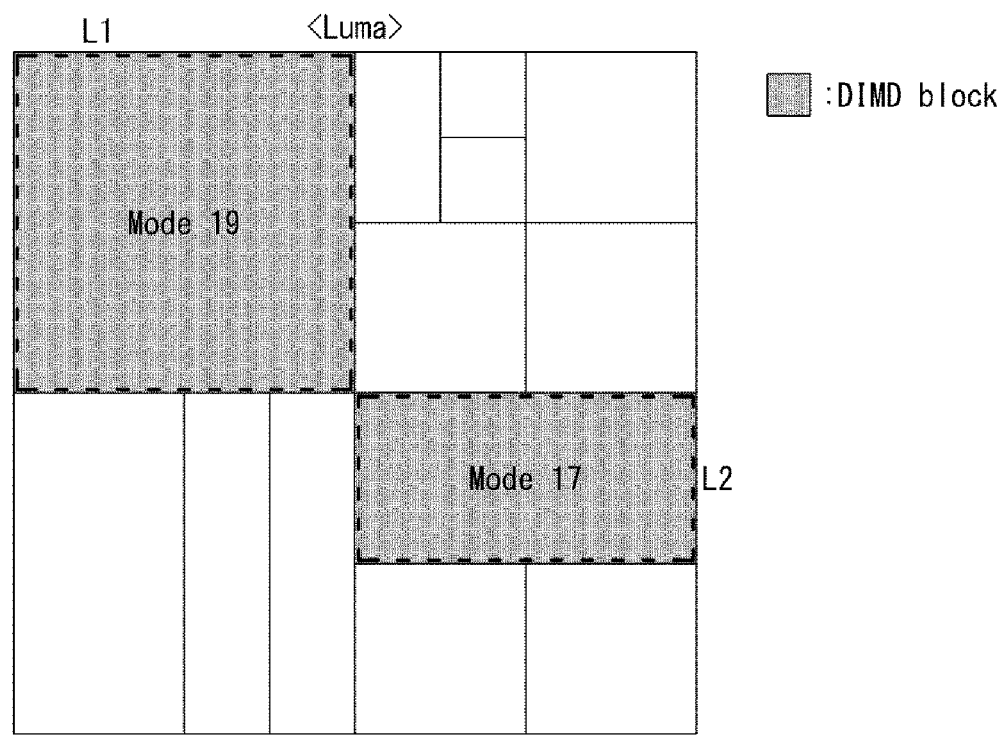
FIG. 15 is an embodiment to which the present invention is applied and is a diagram for illustrating a method of determining an intra prediction mode of a chroma block based on an intra prediction mode of a luma block when partition information of the luma block and the chroma block is the same.
Figure 15:
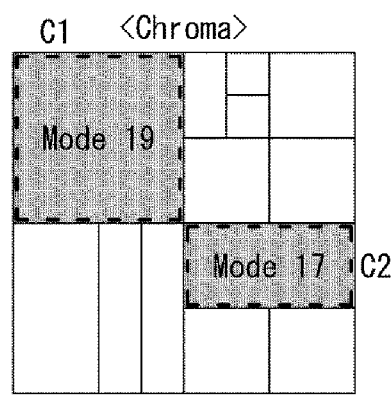

FIG. 15 is an embodiment to which the present invention is applied and is a diagram for illustrating a method of determining an intra prediction mode of a chroma block based on an intra prediction mode of a luma block when partition information of the luma block and the chroma block is the same.

The present invention provides a method of encoding or decoding on a chroma block based on an intra prediction mode of a luma block.

In one embodiment, the present invention provides a method of determining an intra prediction mode of a chroma block using an intra prediction mode of a luma block when at least one of partition information of the luma block and the chroma block is the same. In this case, the partition information includes at least one of the division structure, shape or size of the luma block or the chroma block.

For example, if a luma block and a chroma block are divided in the same shape or size (however, in the case of the 4:2:0 format, a chroma component is the ¼ size of a luma component) and a prediction mode derivation method has been applied to the luma block, the chroma block may use an intra prediction mode of the luma block without any change.

Referring to FIG. 15, FIG. 15(a) shows the block division structure of a luma component, and FIG. 15(b) shows the block division structure of a chroma component corresponding to the luma component. Furthermore, a shaded block shows a block (or DIMD block) to which a prediction mode derivation method has been applied among partition blocks.

The decoder may apply a prediction mode derivation method to chroma blocks C1, C2 at locations corresponding to blocks L1, L2 to which a prediction mode derivation method has been applied within a luma component.

In this case, as in FIG. 15(b), when the division structure and block shape of the chroma component are the same as those of the luma component, the above-described prediction mode derivation method is not applied to the chroma blocks C1, C2, and an intra prediction mode of the luma blocks L1, L2 may be set as an intra prediction mode of the chroma blocks C1, C2.

Accordingly, the decoder may decode the chroma blocks based on the set intra prediction mode.

In another embodiment, the chroma blocks may be decoded using one of intra prediction modes of neighboring (left, top, top-right, bottom-right) blocks of a current chroma block.

Figure 16:
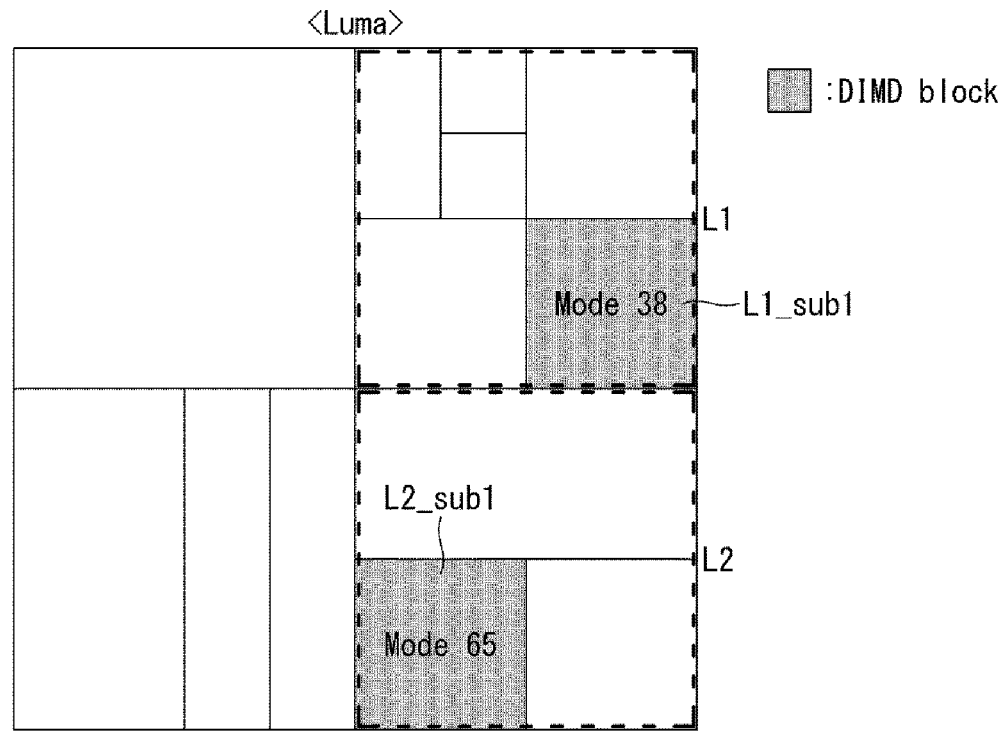
FIG. 16 is an embodiment to which the present invention is applied and is a diagram for illustrating a method of determining an intra prediction mode of a chroma block based on a chroma mode derivation flag when partition information of a luma block and the chroma block is not the same.
Figure 16:
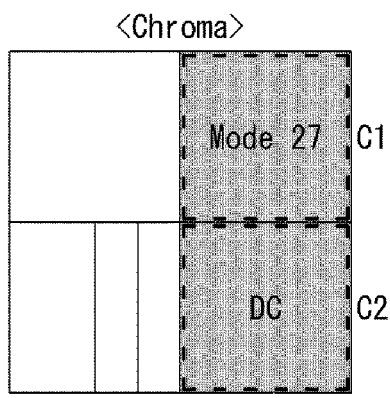

FIG. 16 is an embodiment to which the present invention is applied and is a diagram for illustrating a method of determining an intra prediction mode of a chroma block based on a chroma mode derivation flag when partition information of a luma block and the chroma block is not the same.

The present invention provides a method of encoding or decoding a chroma component based on a prediction mode derivation method.

In one embodiment, the present invention provides a prediction mode derivation method for a chroma block when partition information of a luma block and the chroma block is not the same. In this case, the partition information includes at least one of the division structure, shape or size of the luma block or the chroma block.

For example, when the division structures of a luma block and a chroma block are different or at least one of the block shape or block size thereof is different, the decoder may determine whether to apply a prediction mode derivation method regardless of coding information of a luma component. In this case, the coding information includes at least one of a prediction mode and a luma mode derivation flag. The luma mode derivation flag indicates whether an intra prediction mode of the luma block is derived.

In an embodiment of the present invention, although partition information of a luma block and a chroma block is different, but a prediction mode derivation method has been applied to some of or all luma blocks, an intra prediction may be performed on the chroma block based on a chroma mode derivation flag. The chroma mode derivation flag indicates whether an intra prediction mode of the chroma block is derived.

Referring to FIG. 16, FIG. 16(a) shows the block division structure of a luma component, and FIG. 16(b) shows the block division structure of a chroma component corresponding to the luma component. Furthermore, a shaded block shows a block (or DIMD block) to which a prediction mode derivation method has been applied among partition blocks.

As in FIG. 16(b), when partition information of the chroma component is different from that of the luma component, the chroma mode derivation flag of a chroma block may be checked (without using an intra prediction mode of a luma block).

As in FIG. 16(a), although at least one block L1_sub1 to which a prediction mode derivation method has been applied is present within a luma component L1 corresponding to a chroma component C1, a prediction mode derivation method may be applied to the chroma component C1. For example, although an intra prediction mode of the luma subblock L1_sub1 within the luma component L1 is Mode 38, an intra prediction mode of the chroma component C1 may be performed based on a prediction mode derivation method. Accordingly, the intra prediction mode of the chroma component C1 may be Mode 27.

Likewise, although at least one block L2_sub1 to which a prediction mode derivation method has been applied is present within a luma component L2 corresponding to a chroma component C2, a prediction mode derivation method may be applied to the chroma component C2. For example, although an intra prediction mode of a luma subblock L2_sub1 within the luma component L2 is Mode 65, an intra prediction mode of the chroma component C2 may be performed based on a separate the prediction mode derivation method. Accordingly, the intra prediction mode of the chroma component C2 may be a DC Mode.

Accordingly, an optimal intra prediction mode for the chroma blocks C1, C2 may be determined based on the prediction mode derivation method. The chroma blocks may be decoded using the optimal intra prediction mode.

Figure 17:
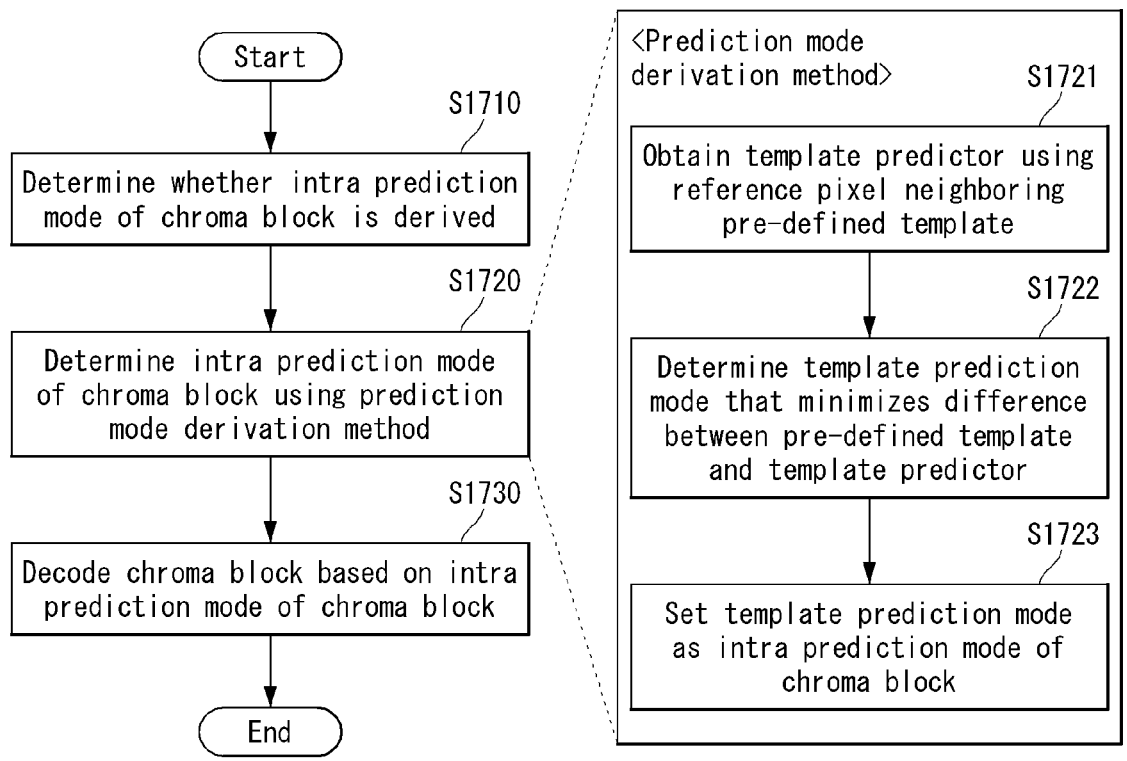
FIG. 17 is an embodiment to which the present invention is applied and shows a flowchart in which an intra prediction mode of a chroma block is determined based on a chroma mode derivation flag.

FIG. 17 is an embodiment to which the present invention is applied and shows a flowchart in which an intra prediction mode of a chroma block is determined based on a chroma mode derivation flag.

The decoder may determine whether an intra prediction mode of a chroma block is derived (S1710). For example, the decoder may determine whether an intra prediction mode of a chroma block is derived based on a chroma mode derivation flag indicating whether the intra prediction mode of the chroma block is derived.

The decoder may determine the intra prediction mode of the chroma block using a prediction mode derivation method (S1720). In this case, the embodiments described in this specification may be applied to the prediction mode derivation method.

For example, the prediction mode derivation method may be performed through the following process.

First, the decoder may obtain a template predictor using a reference pixel neighboring a pre-defined template (S1721). In this case, the pre-defined template means a set of predefined pixels and may also be represented as a pattern. For example, if a target block is an N×N size, the template may mean a pixel block of an N×L or L×N (L≤N) size. In this case, L may correspond to the size of a subblock within the target block, but the present invention is not limited thereto and may have a value of 1 or more.

In one embodiment, the template may be information already known to the encoder and/or the decoder, but the present invention is not limited thereto and the template may be adaptively determined.

The decoder may determine a template prediction mode that minimizes a difference between the pre-defined template and the template predictor (S1722).

The decoder may set the template prediction mode as an intra prediction mode of the chroma block (S1723).

Meanwhile, as described above, when the intra prediction mode of the chroma block is derived, the decoder may decode the chroma block based on the intra prediction mode of the chroma block (S1730).

As described above, the embodiments described in the present invention may be implemented and performed on a processor, a microprocessor, a controller or a chip. For example, the function units shown in FIGS. 1 and 2 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a video on demand (VoD) service providing apparatus, an Internet streaming service providing apparatus, a three-dimensional (3D) video apparatus, a teleconference video apparatus, and a medical video apparatus and may be used to code video signals and data signals.

Furthermore, the processing method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a chroma block of a video signal by an apparatus, comprising:
identifying derivation for an intra prediction mode of the chroma block;
determining an intra prediction mode of the chroma block based on a prediction mode derivation method in response to the derivation for the intra prediction mode of the chroma block; and
decoding the chroma block based on the intra prediction mode of the chroma block,
wherein the prediction mode derivation method includes:
obtaining a template predictor based on a reference pixel neighboring a pre-defined template;
determining a template prediction mode to minimize a difference between the pre-defined template and the template predictor; and
setting the template prediction mode as the intra prediction mode of the chroma block,
wherein the derivation for the intra prediction mode of the chroma block is identified based on at least one of a chroma mode derivation flag, a luma mode derivation flag, or division information of the chroma block, and
wherein the chroma mode derivation flag indicates derivation for the intra prediction mode of the chroma block, the luma mode derivation flag indicates derivation for an intra prediction mode of a luma block, and the division information comprises at least one of a division structure, shape or size of the chroma block,
wherein the method further comprising:
checking whether the division information of the chroma block is identical with division information of the luma block,
wherein the intra prediction mode of the chroma block is derived based on the division information of the chroma block that is identical with the division information of the luma block.

2. The method of claim 1, further comprising:
obtaining the chroma mode derivation flag,
wherein the intra prediction mode of the chroma block is derived based on the chroma mode derivation flag.

3. The method of claim 1, further comprising:
checking whether the intra prediction mode of the luma block has been derived based on the luma mode derivation flag,
wherein if the intra prediction mode of the luma block has been derived, the intra prediction mode of the chroma block is derived.

4. The method of claim 1,
wherein the chroma mode derivation flag or the luma mode derivation flag is defined in at least one level of a video parameter set, a sequence parameter set, a picture parameter set, a slice segment header, a coding unit header or a processing unit.

5. The method of claim 1,
wherein the pre-defined template neighbors a top or left of the chroma block and has an N×L or L×N size, and
wherein a maximum size of the reference pixel is 2(L+N)+1 neighboring the pre-defined template.

6. An apparatus for decoding a chroma block of a video signal, comprising:
one or more processors configured to:
identify derivation for an intra prediction mode of the chroma block, determine an intra prediction mode of the chroma block based on a prediction mode derivation method in response to the derivation for the intra prediction mode of the chroma block, obtain a predictor of the chroma block based on the intra prediction mode of the chroma block;
reconstruct the video signal based on the predictor of the chroma block,
obtain a template predictor based on a reference pixel neighboring a pre-defined template,
determine a template prediction mode to minimize a difference between the pre-defined template and the template predictor, and
set the template prediction mode as the intra prediction mode of the chroma block,
wherein the derivation for the intra prediction mode of the chroma block is identified based on at least one of a chroma mode derivation flag, a luma mode derivation flag, or division information of the chroma block, and
wherein the chroma mode derivation flag indicates derivation for the intra prediction mode of the chroma block, the luma mode derivation flag indicates derivation for an intra prediction mode of a luma block, and the division information comprises at least one of a division structure, shape or size of the chroma block,
wherein the one or more processors are further configured to:
check whether the division information of the chroma block is identical with division information of the luma block,
wherein the intra prediction mode of the chroma block is derived based on the division information of the chroma block that is identical with the division information of the luma block.

7. The apparatus of claim 6, wherein the one or more processors are further configured to:
obtain the chroma mode derivation flag, and
wherein the intra prediction mode of the chroma block is derived based on the chroma mode derivation flag.

8. The apparatus of claim 6, wherein the one or more processors are further configured to:
confirm whether the intra prediction mode of the luma block has been derived based on the luma mode derivation flag, and
wherein if the intra prediction mode of the luma block has been derived, the intra prediction mode of the chroma block is derived.

9. The apparatus of claim 6,
wherein the chroma mode derivation flag or the luma mode derivation flag is defined in at least one level of a video parameter set, a sequence parameter set, a picture parameter set, a slice segment header, a coding unit header or a processing unit.

10. The apparatus of claim 6,
wherein the pre-defined template neighbors a top or left of the chroma block and has an N×L or L×N size, and
wherein a maximum size of the reference pixel is 2(L+N)+1 neighboring the pre-defined template.

* * * * *